(12) United States Patent
Knecht et al.

(10) Patent No.: US 10,218,805 B2
(45) Date of Patent: Feb. 26, 2019

(54) METHOD AND APPARATUS FOR CAUSING DELAY IN PROCESSING REQUESTS FOR INTERNET RESOURCES RECEIVED FROM CLIENT DEVICES

(71) Applicant: CLOUDFLARE, INC., San Francisco, CA (US)

(72) Inventors: Dane Orion Knecht, San Francisco, CA (US); John Graham-Cumming, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 512 days.

(21) Appl. No.: 15/179,454

(22) Filed: Jun. 10, 2016

(65) Prior Publication Data
US 2017/0359432 A1 Dec. 14, 2017

(51) Int. Cl.
*H04L 9/00* (2006.01)
*H04L 29/08* (2006.01)
*H04L 29/06* (2006.01)

(52) U.S. Cl.
CPC ...... *H04L 67/2814* (2013.01); *H04L 63/0428* (2013.01); *H04L 63/1458* (2013.01); *H04L 67/02* (2013.01); *H04L 67/42* (2013.01)

(58) Field of Classification Search
CPC ........... H04L 67/02; H04L 9/00; G06F 15/16; H04M 2242/15
USPC ........................................ 709/217, 219, 231
See application file for complete search history.

(56) References Cited

U.S. PATENT DOCUMENTS

| | | |
|---|---|---|
| 7,568,224 B1 | 7/2009 | Jennings et al. |
| 8,463,627 B1 | 6/2013 | Hirose et al. |
| 8,613,089 B1 | 12/2013 | Holloway et al. |
| 2010/0031362 A1 | 2/2010 | Himberger et al. |
| 2012/0158993 A1 | 6/2012 | McNamee et al. |
| 2012/0324113 A1 | 12/2012 | Prince et al. |
| 2013/0103785 A1 | 4/2013 | Lyon |
| 2014/0047542 A1 | 2/2014 | Holloway et al. |
| 2014/0096194 A1 | 4/2014 | Bhogavilli et al. |
| 2014/0373138 A1 | 12/2014 | Park et al. |

OTHER PUBLICATIONS

Non-Final Office Action for U.S. Appl. No. 15/211,790, dated Nov. 4, 2016, 15 pages.
(Continued)

*Primary Examiner* — Josnel Jeudy
(74) *Attorney, Agent, or Firm* — Nicholson De Vos Webster & Elliott LLP

(57) ABSTRACT

A method and apparatus for delaying responses to requests in a server are described. Upon receipt, from a client device, of a first request for a resource at a first location, a response that includes a redirection instruction to a second location is transmitted, where the response includes a first number of redirects that the client device is to complete prior to the first request being fulfilled. Upon receipt of a following request including a number of redirects, determining whether the number of redirects has been performed. When the number of redirects has not been performed the transmission of the redirection instruction is repeated with a number of redirects smaller than the first number of redirects until the receipt of a request indicating that the number of redirects has been performed. When the number of redirects has been performed the request is fulfilled.

30 Claims, 6 Drawing Sheets

(56) References Cited

OTHER PUBLICATIONS

Non-Final Office Action for U.S. Appl. No. 15/257,209, dated Dec. 27, 2016, 14 pages.
Notice of Allowance from U.S. Appl. No. 15/211,790, dated Apr. 25, 2017, 13 pages.
Notice of Allowance from U.S. Appl. No. 15/257,209, dated Apr. 21, 2017, 12 pages.
Non-Final Office Action from U.S. Appl. No. 15/590,290, dated Jan. 25, 2018, 15 pages.
Blocking Brute Force Attacks, Retrieved from http://www.owasp.org/index.php?title=Blocking_Brute_Force_Attacks&oldid=210449, This page was last modified on Mar. 4, 2016, at 04:58, 5 pages.
M'Raihi D., et al., "TOTP: Time-Based One-Time Password Algorithm," Internet Engineering Task Force (IETF), RFC 6238, May 2011, pp. 1-16.

METHOD AND APPARATUS FOR CAUSING DELAY IN PROCESSING REQUESTS FOR INTERNET RESOURCES RECEIVED FROM CLIENT DEVICES

FIELD

Embodiments of the invention relate to the field of network services; and more specifically to protection against attacks on Internet resources.

BACKGROUND

Attacks on domains hosted on servers (e.g., DoS attacks, bruteforce login attacks (login to a website or to an web API)) are becoming more commonplace on the Internet and are difficult to detect and mitigate. Generally speaking, a DoS attack is launched by sending a large amount of packets to the domain with the intention to cause the domain to be unavailable or respond slowly to legitimate traffic. A bruteforce login attack involves systematically transmitting requests to the domain for checking all possible keys or passwords until the correct one is found to access the resources hosted at the domain.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1A:
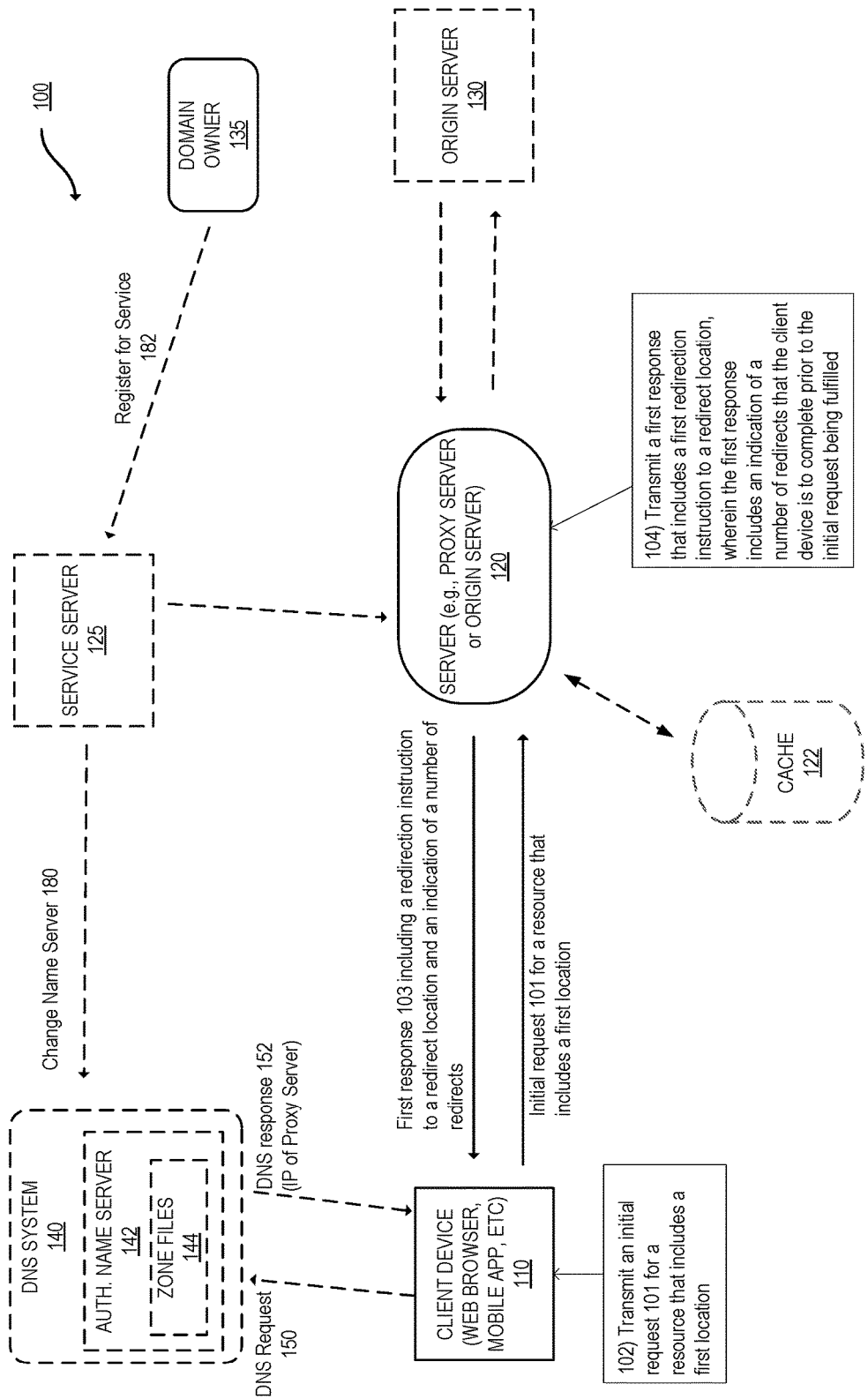
FIG. 1A illustrates a block diagram of an exemplary architecture in which a server is operative to cause a delay in processing requests for internet resources received from client devices according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and an apparatus for protecting resources of a domain hosted on a server from an attack by delaying requests received from a client device are described. In one embodiment, a server receives, from a client device, a first request for a resource (where the first request includes a first location), and transmits a first response to the client device that includes a first redirection instruction to a second location. In the following description this first request is referred to as the initial request, and the first response as the initial response. The first response includes an indication of a first number of redirects that the client device is to complete prior to the first request being fulfilled. The first number of redirects may be referred to as the initial number of redirects. In some embodiments, the first number of redirects is two or more, and will cause the client device to perform at least two redirects prior to the initial request being fulfilled. The server receives, from the client device, a second request for the resource, where the second request includes the second location as a result of the first redirection instruction; and responsive to determining, from the second request, that the first number of redirects has not been performed, the server performs a set of operations including: (a) transmitting a second response to the client device that includes a second redirection instruction to the second location. The second response includes an indication of a second number of redirects that the client device is to complete prior to the first request being fulfilled. The second number of redirects is smaller than the first number of redirects. The operations further include: (b) receiving, from the client device, a third request for the resource as a result of the second redirection instruction, where the third request includes the second location, and (c) responsive to determining, from the third request, that the second number of redirects has not been performed by the client device, the server repeats operation (a) while including an indication of a reduced number of redirects until a request is received from the client device that indicates that the reduced number of redirects has been performed by the client device, and (d) responsive to determining, from the third request, that the second number of redirects has been performed by the client device, fulfilling the first request (i.e., the initial request). Thus, the method and apparatus presented herein enable the introduction of delays when responding to requests for resources by causing redirection of a request to another location during a desired number of redirects, consequently preventing an attacker from overwhelming the host of the resource and/or from succeeding in a brute-force attack.

FIG. 1 illustrates a block diagram of an exemplary architecture 100 in which a server is operative to protect a domain from an attack according to one embodiment. The architecture includes a client device 110, a server 120, a domain owner 135 and optional components such as origin server 130, service server 125 and DNS system 140.

The client device 110 is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client device to request access to resources hosted on a server. In a non-limiting example, a user at the client device 110 may request access to secured accounts. The accounts are protected through a secure cryptographic connection requiring account information (e.g., username and password) to login into the account. In some embodiments, the client device 110 is a malicious device (i.e., including malicious code (e.g., bots, malware, etc.) and/or operated by a malicious user) operative to launch an attack on the resources. In one embodiment, the attack can be a brute-force login attack (e.g., an API login attack), which involves the server hosting the resources receiving multiple requests for checking multiple account information combinations (e.g., all possible cryptographic keys or passwords associated with a username) until the correct account information is found and access to the resources is gained. In other embodiments, the attack can be any unauthorized request to access the resources. In some embodiments, the attack can be a Denial of Service (DoS) attack in which a large amount of packets are sent to the domain with the intention of causing the domain to be unavailable or respond slowly to legitimate traffic.

The server 120 is a computing device coupled with the client device through a network (not illustrated). The server 120 is operative to receive and fulfil requests for Internet resources hosted at one or more domains. For example, the domain owner 135 owns one or more domains (e.g., example.com) for which the server 120 may receive requests. The server may receive requests for the resources at a given location of the domain (e.g., example.com/login). In one embodiment and as described in greater detail later herein, the server 120 is operative to protect Internet resources owned by the domain owner 135 by delaying responses to requests for the resources.

In some embodiments, the server 120 may be an origin server that may serve and/or generate network resources (e.g., web pages, images, word processing documents, PDF files movie files, music files, or other computer files). For example the server 120 may host the domain of the domain owner 135 (e.g., example.com) and is operative to respond to requests for resources at that domain. Although not illustrated in FIG. 1, it should be understood that the network resources of the origin servers may be stored separately from the device that responds to the requests.

In another embodiment, the server 120 is a proxy server part of a cloud-based proxy service which provides different services for customers (e.g., the domain owner 135). In this embodiment, the server 120 is situated between client devices (e.g., client device 110) and the origin server 130. In one embodiment, the server 120 is a reverse proxy server. Certain network traffic is received and processed through the server 120. For example, web traffic (e.g., HTTP requests/ responses, HTTPS requests/responses, SPDY requests/responses, etc.) for domains of the origin server 130 may be received and processed at the server 120. In one embodiment, the domain owner 135 are customers of the cloud-based proxy service. The owner of the server 120 is typically different than the owner of the origin server 130. In addition, the server 120 is not typically part of the local network of the origin server 130. For example, the server 120 is outside of the local area network of the origin server 130 and is typically not physically accessible by the owner/administrator of the origin server 130.

By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides protection against attacks on resources at domains hosted on origin server by enabling the server 120 to delay responses to requests for the resources.

Generally speaking, the server 120 receives certain network traffic from the client devices 110 requesting Internet resources. For example, the server 120 may receive requests for an action to be performed on an identified resource (e.g., an HTTP GET request, an HTTP POST request, other HTTP request methods, or other requests to be applied to an identified resource on an origin server) from the client device 110. When the server 120 is a proxy server, the request received from the client device 110 may be destined for an origin server (e.g., origin server 130).

The server 120 analyzes incoming traffic and takes one or more actions on the incoming traffic. As will be described in greater detail later herein, the incoming traffic may be part of an attack on resources of a domain (brute-force attack on an API, a DoS attack, or other types of attacks) and steps may be taken to mitigate the attack. However, assuming, for example that there is not a threat, the server 120 may cause the incoming traffic to be processed. In some embodiments, when the server 120 is a proxy server it may transit the outgoing traffic to the appropriate origin server 130. For example, the proxy server may transmit a request (e.g., an HTTP GET request) for a resource of the origin server 130. For example, an origin server may transmit a response (e.g., an HTTP response) with the requested resource to the proxy server. The proxy server may analyze the incoming traffic including the response and take one or more actions, including, for example, transmitting the response to the requesting client device. The proxy server may also cache resources for the domains and respond to requests from client devices locally if the requested resource is in cache (e.g., stored in cache 122).

In some embodiments, incoming traffic is received at a particular server 120 as a result of a DNS request 150 for a domain of one of the domain owner 135 resolving 152 to an IP address of the server 120. By way of example, DNS record(s) for the domain "example.com" may resolve to an IP address of a server 120. In some embodiments, multiple domains that may be owned by different domain owners may resolve to the same server 120 (e.g., the same IP address or a different IP address of the server 120).

In some embodiments, the domain owner 135 is a customer of a cloud-based service and registers their respective domain for the service. For example, the authoritative name servers for each domain of the domain owner 135 may be changed to the authoritative name server 142 of the service at operation 180. It should be understood that the backup authoritative name server serving the domain may also be changed to an authoritative name server of the service. The zone file record for the domain is also changed such that DNS resolution requests for the domain owned by the domain owner 135, which corresponds with the origin server 130, resolve to the server 120. In one embodiment, a customer (e.g., the domain owners 135 or other entity (e.g., web administrators) on behalf of the domain owner 135) may use the service server 125 to change their authoritative name server to the authoritative name server 142 and change their zone file to have their domain point to the server 120.

The service server 125 is an electronic device operated by the cloud-based proxy service, which provides a set of tools and interfaces for the domain owner 135 and is accessible over the Internet. For example, the service server 125, among other things, allows the domain owner 135 to register for the service, view statistics/logs of events, and report suspicious events. The service server 125 includes tools to assist the domain owner 135 in changing their authoritative name servers and zone file record. It should be understood, however, that the domain owner 135 may change their authoritative name server and zone file without use of the service server 125 (i.e., they may directly change the authoritative name server and zone file).

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin server 130. Accordingly, when the DNS system 140 resolves a request for a domain corresponding to the origin server 130, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

When the server 120 is a proxy server of a cloud-based proxy service, while FIG. 1 illustrates a single server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP. While FIG. 1 illustrates a single origin server 130 and a single client device 110 respectively coupled with the server 120, in some embodiments the server is coupled with multiple origin servers and/or with multiple client devices. Moreover, in some embodiments, there are multiple proxy servers providing service for a particular domain.

In some embodiments, the client device 110 makes an initial request 101 for a resource at a first location (e.g., an HTTP GET request, or other request), which is transmitted to the server 120. The first location identifies the requested resource (e.g., the first location can be a Uniform Resource Identifier (URI) of the resource). In some embodiments, the initial request 101 is a request to login to a user's account and includes login credentials. The login credential enable the client device to login into the user's account and access resources protected via the login credentials. For example the login credentials can include a username (e.g., name, email address, phone number, or any other identifier identifying the account's user) and a password (i.e., acting as a cryptographic key for associated with the username. In some embodiments, the request is transmitted from the client device 101 as part of an attack on the first domain. For example the attack can be a brute-force attack for gaining access to one or more accounts of users. In this case the client device will systematically transmit requests to the first domain for checking all possible keys or passwords until the correct one is found to access the resources of the user accounts hosted at the first domain. The initial request can be one of these systematically transmitted requests.

The server 120 analyzes the initial request 101 and transmits (operation 104) a first response 103 to the client device 110 which causes the client device to redirect the request for the resource to a second location (which will be referred to herein as the redirect location) for a desired number of redirects. The response 103 includes a first redirection instruction to the redirect location and an indication of an initial number of redirects (i.e., the desired number of redirects) that the client device is to complete prior to the initial request 101 for the resource being fulfilled. In some embodiments, the number of redirects is more than two. In one embodiment, the first location and the redirect location can be in a same domain, alternatively the first location and the redirect location can be in different domains.

In some embodiments, the server 120 is an origin server that is operative to fulfil requests received from client devices and respond to the requests by retrieving the requested resources. The origin server may host the resources or may be coupled to another server hosting the resources. In these embodiments, upon receipt of the initial request 101 instead of responding to the request and transmitting the resources to the client device 110, the server transmits the temporary redirect message causing the client device 110 to redirect the request for a predetermined number of redirects prior to having the initial request fulfilled therefore causing a delay in the processing of the initial request.

In other embodiments, when the server 120 is a proxy server part of a cloud-based proxy service, the server 120 is operative to process requests received from the client device 110 by transmitting the request to the origin server 130 hosting the domain. In some of these embodiments, the server 120 can also retrieve the requested resources from a cache and may not transmit the requests to the origin server 130 prior to responding to the requests if the resources are available at the cache. Upon receipt of the request 101 instead of fulfilling the request (by either transmitting the request to the origin server 130 or retrieving the resources from a cache) and transmitting the resources to the client device 110, the proxy server transmits the temporary redirect response 103 causing the client device to redirect the request for a predetermined number of redirects prior to having the initial request fulfilled therefore causing a delay in the processing of the initial request.

In some embodiments, the server 120 may transmit the temporary redirect response 103 for all received requests. Alternatively, the server 120 may transmit the temporary redirect response 103 following a determination that the server (or the requested resource) is under attack and that the initial request is potentially an illegitimate request. The determination that the server (or the requested resource) is under attack may be performed through a variety of mechanisms, which may be different based on the type of attack. In some embodiments, when the server 120 is a proxy server of a cloud-based proxy service, the service allows a customer (e.g., a domain owner 135) to specify that they are under attack and that they want a heightened level of security for their Internet resources hosted at the domain (e.g., website, databases, API, etc.). The heightened level of security will cause the cloud-based proxy service to add an additional set of protections to stop potentially malicious HTTP traffic from being passed to their origin server. For example, this may be used to counter a brute-force attack in which a malicious entity systematically transmits login requests to gain access to cryptographically secured resources.

For example the customer may have a website that is experiencing a slow response time, a high CPU load, etc., which may lead the customer to believe that they are under a DoS attack. The customer may further determine that a high number of unsuccessful successive login attacks have been attempted indicating that the resources are under a brute-force attack. After identifying to the cloud-based proxy service that they are under attack and/or that they want additional security protections, the service puts them into a heightened-security mode, which is referred herein as "under attack mode."

In one embodiment, the service may enable the under attack mode for a domain (and/or for a resource at a given location) if an administrator detects an attack or the proxy servers receive an abnormally high amount of requests to the domain (or the resource). In one embodiment, the service enables the under attack mode for all visitors (and thus all requests for that domain/resource will be subject to the under attack mode). In another embodiment, the service enables the under attack mode for only a selected number of visitors (e.g., the under attack mode may only be applied for requests from IP addresses that have previously been known to be involved in malicious behavior or which are suspected of being malicious).

Many attacks involve sending a large amount of traffic of a certain type to an intended target (e.g., a DoS attack) or repeated requests to an intended target in an attempt to gain access to cryptographically protected resources (e.g., brute-force attack to access users' accounts). In one embodiment, the server 120 automatically determines whether the server or the requested resource is under attack by automatically determining that there is an abnormal amount of traffic destined to a particular destination (e.g., the traffic spikes from what is normally encountered, abnormal number of requests for a particular resource (e.g., abnormal number of unsuccessful login requests to an API as in a brute-force attack)). By way of example, the server 120 and/or the service server 125 may establish a threshold amount of what the normal traffic rate is for a resource and/or IP address and determine when traffic exceeds that threshold. In one embodiment, when the server 120 is a proxy server, the normal traffic rates may be individual and separate for a particular data center or proxy service node and the attack is identified for each individual proxy service node, while in some embodiments the attack is identified through an aggregation of traffic across all proxy service nodes that handle traffic for that domain.

By way of a specific example, an attack may be detected by using one or more parameters that exceed a threshold, including one or more of the following to a particular resource: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DoS attack. For example, the server 120 may detect if a domain has gone offline due to a heavy load, which may be an indication of an attack. As another example, the detection of a spike in metrics pertaining to a page or a resource request may be an indication of an attack (e.g., a particular request header, cookie, size of the request, non-standard control characters, a large number of GET parameters, a large number of POST parameters, a number of unsuccessful login requests, etc.). In one example, when requests includes account information (login credentials, username and password) for securely accessing a user account at a location, the server may automatically determine that the account is under attack when it determines that the account information is invalid.

Thus in some embodiments, upon determination that the resource or the server 120 is under attack, the server 120 transmits the first response 103, without processing the initial request 101, causing the client device to request the resource at a temporary redirect location for a desired number of redirects prior to the initial request being fulfilled. As a result, the request will not be transmitted to the origin server thereby saving the resources of the origin server from having to process the request.

Figure 1B:
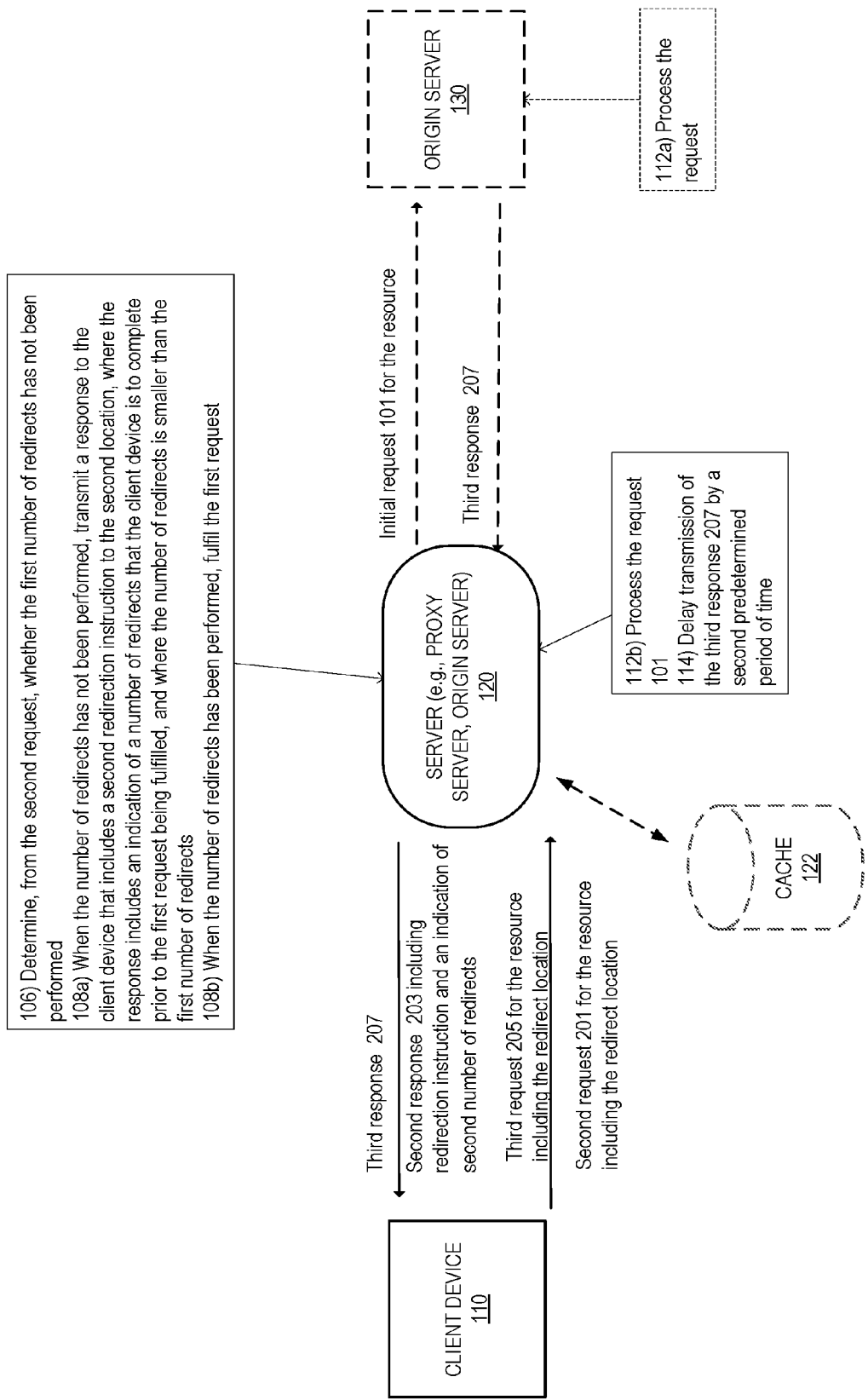
FIG. 1B illustrates a block diagram of exemplary operations performed when a client device receives a temporary redirect request in accordance with some embodiments.

FIG. 1B illustrates a block diagram illustrating exemplary operations performed when a client device receives a temporary redirect response 103 in accordance with some embodiments. Upon receipt of the response 103 from the server 120, the client device 110 is caused to transmit one or more other requests for the resource at the second location. The second location is the redirect location received by the client device 110 as part of the response 103 from the server 120. In one embodiment, a second request 201 for the resource at the redirect location resolves to the server 120. This request 201 may be transmitted by the client device after the receipt of the initial response 103 from the client device, alternatively this request 201 is transmitted following another response transmitted from the server 120 following the occurrence of a given number of redirects after the receipt of the initial request 101.

While the embodiments, below will be described with the server 120 receiving the request for the resource at the redirect location, in alternative embodiments, the request 201 can resolve to another server (not illustrated) which is different from the server 120 (which has received the initial request 101). This other server may be located remotely from the server 120 adding an additional delay in the fulfillment of the initial request 101. In some embodiments, this other server is an electronic device that may be administered by the same entity as the server 120. In one embodiment, this server is dedicated for processing redirected requests and will be operative to perform the operations 106, 108a or 108b as described with reference to server 120.

Upon receipt of the second request 201, the server 120 analyses it and determines, at operation 106, whether the number of redirects has been performed. In some embodiments, the number of redirects performed by the client device since the transmission of the initial request is encoded within the redirect location which is part of the second request 201. For instance, in one embodiment, the server 120 may check whether the number of redirects encoded within the second location is a predetermined value, such as 0.

When the second number of redirects has not reached the predetermined value (e.g., it is not 0), it is an indication that the client device 110 has not yet performed the total number of redirects desired by the server 120 (for example the desired number of redirects may have been set by the server 120 when the initial request 101 was first received). Accordingly, at operation 108*a*, upon determination that the number of redirects has not been performed, the server 120 transmits a second response 203 to the client device 110 that includes a second redirection instruction to the second location. The second response 203 includes an indication of a second number of redirects that the client device 110 is to complete prior to the initial request being fulfilled. The second number of redirects is smaller than the initial number of redirects transmitted by the server 120 in the first response 103.

The second response 203 causes the client device 110 to continue to redirect the request to the second location, without fulfilling the request, for a remaining number of redirects. In one embodiment, the second number of redirects is equal to the initial number of redirects decreased by one. For example, if the initial number of redirects desired by the server 120 is a number M of redirects, where M>1, the second response 203 transmitted by the server 120 includes a number M−1 of redirects that need to be performed by the client device prior to having the initial request 101 fulfilled. In other embodiments, the server 120 may select another number K of redirects prior to the initial request being fulfilled. In some embodiments, the number K may be greater than the number of redirects M, equal, or smaller than M without departing from the scope of the present invention. Further, the second response 203 causes the client device to transmit a third request 205 for the resource at the redirect location. Upon receipt of this third request, the server 120 may repeat operation 106 and determine whether the client device has performed the number of redirects as identified in the second response 203. According to this determination, the server 120 may perform operation 108*a* or alternatively 108*b*. This process is repeated for the desired number of redirects set by the server 120 until the server determines, at operation 108*b*, that the number of redirects has been performed.

Thus, when the server 120 determines from the second request, that the number of redirects has been performed (e.g., the initial number of redirect or the second number of redirects), it is an indication that the client device has performed the total number of redirects desired by the server 120 (for example the desired number of redirects has been set by the server 120 when the initial request 101 was first received). In this case, at operation 108*b*, the server 120 fulfils the request for the resource at the initial location which was received in the initial request 101.

The server 120 analyzes the request for the resource at the initial location and takes one or more actions. The server 120 may process the request and transmit a response 207 to the requesting client device 110. In some embodiments, if the initial request is an API login request with erroneous login credentials (username and password), the response 207 may include a denial to access the requested resources. In some embodiments, the response 207 may include the resource requested at the initial location in the initial request 101. In some embodiments, the initial location of the resource (as received in the initial request) is encoded in the redirect location. In this embodiment, the server 120 may extract the initial location from the redirect location and process the request to retrieve the resource at that initial location. In other embodiments, after determining that the number of redirects has been performed, the server 120 can send a response to the client device with a redirection instruction to the initial location, while setting a cookie or an indication that confirms the client device has performed the total number of desired redirects. The server then receives the request from the client device requesting resources at the initial location, and it checks if the "pass" cookie/indication is included in the request. Upon determining that this request includes the pass cookie/indication, the server 120 fulfils the request for the resource at the initial location. If the cookie/indication is not included the server 120 may deny the request or alternatively retransmit a redirection instruction with a new number of redirects to be performed by the client device.

In some embodiments, when the server 120 is a proxy server of a cloud-based proxy service, it analyzes the request and may transmit a request to the appropriate origin to retrieve the requested resources. The origin server 130 may process the request (operation 112*a*) and then transmit the response 207 (e.g., an HTTP response) with the requested resource to the proxy server. The proxy server may analyze the incoming response 207 and take one or more actions, including, for example, transmitting the response to the requesting client device 110. In this embodiments, the proxy server may also cache the requested resource and may retrieve the it from the cache without transmitting the request to the origin server 130. In one embodiment, the proxy server may request the resource from the origin server 130 when the requested resource is not in the local cache of the proxy server or the cached resource has expired.

In some embodiments prior to transmitting a response, the server 120 may be operative to delay (operation 114) the response 207 by a predetermined period of time introducing further delay in the response to the initial request 101 in addition to the delay caused by the redirection process described above.

The embodiments of the present invention provide mechanisms for protecting Internet resources by delaying the processing of requests from client devices. According to embodiments of the invention, a client device is caused to redirect a request for an Internet resource for a number N of redirects prior to an initial request being fulfilled. As most attacks are launched by a script or other automated bots, and most client devices generally abandon the request of a resource after a certain number of redirects (e.g., after 10 redirects), the mechanisms described herein will cause a request to not be fulfilled at the server 120 (i.e., it will not be processed at the server 120 nor sent to the origin server 130 to be processed) reducing the chances of success of a malicious entity in accessing the requested resource.

Figure 2:
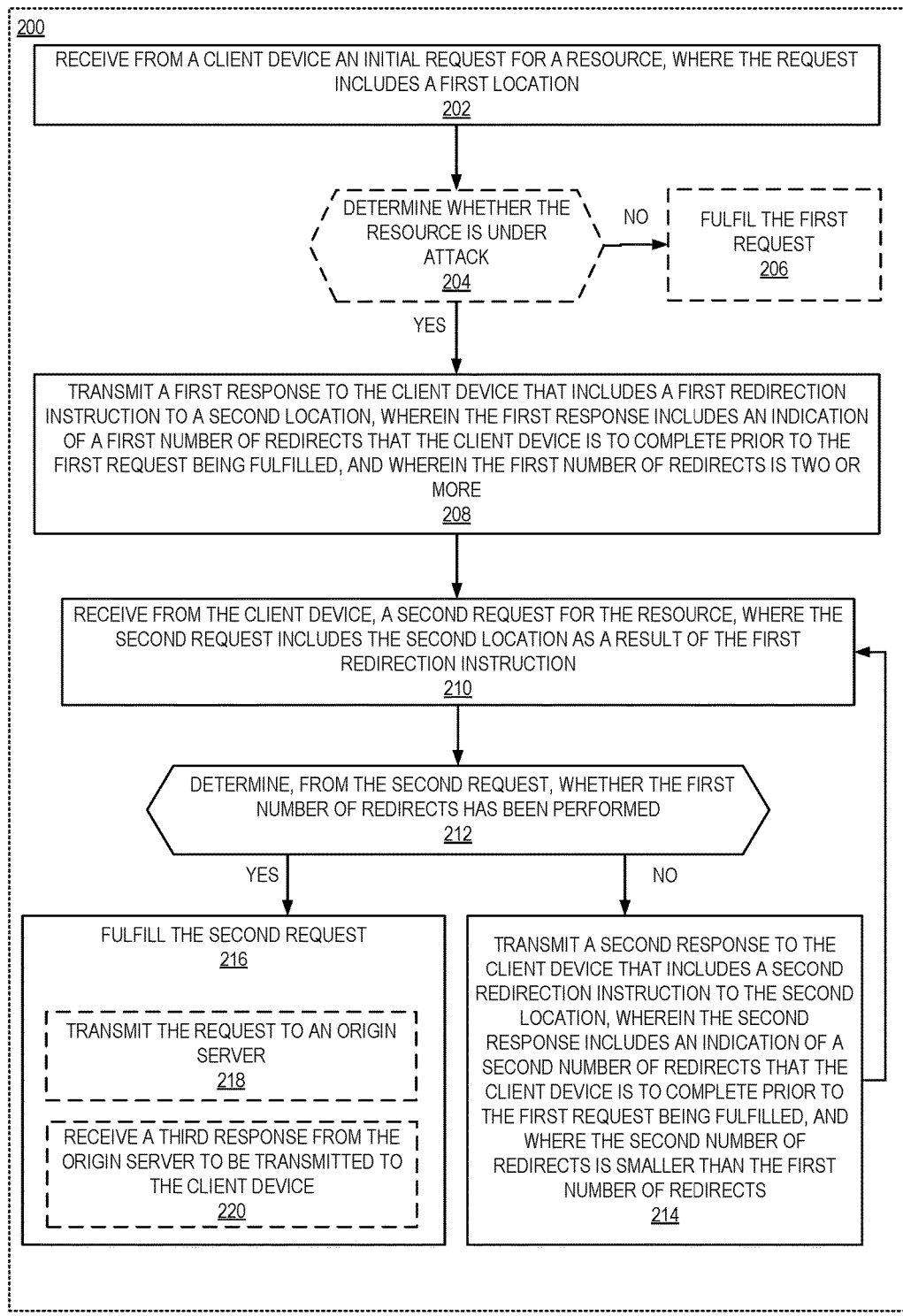
FIG. 2 illustrates a flow diagram of exemplary operations performed at a server for delaying processing of a request received from a client device in accordance with some embodiments.

FIG. 2 is a flow diagram illustrating exemplary operations for delaying a request for Internet resources received from a client device according to one embodiment. The operations in the flow diagram will be described with reference to the exemplary embodiments of the FIGS. 1A-B. However, it should be understood that the operations of the flow diagram can be performed by embodiments of the invention other than those discussed with reference to the other figures, and the embodiments of the invention discussed with reference to FIGS. 1A-B can perform operations different than those discussed with reference to the flow diagram.

FIG. 2 illustrates a flow diagram of exemplary operations 200 performed at a server 120 for delaying processing of a request received from a client device 110. In some embodiments, these operations can be performed to protect the server 120 (or an origin server 130) from a brute-force attack on the internet resources (e.g., a brute force attack on an API, or a website, etc.). In some embodiments as described in further details above, the server 120 can be an origin server hosting the requested resources or alternatively a proxy server part of a cloud-based proxy service providing a service to an owner of a domain of the requested resource. At operation 202, the server 120 receives from a client device 110 a first request (e.g., request 101 which can be an HTTP GET), where the request includes a first location for the resource (e.g., example.com/login). The first request is referred to as the initial request. Flow then moves to optional operation 204 at which the server 120 determines whether the resource is under attack. In some embodiments, this step is skipped and the flow may move from operation 202 to operation 208 without the server 120 determining if the resource is under attack. In some embodiments, if the server determines that the requested resource is not under attack (and therefore that the request is likely a legitimate request) flow moves to operation 206 at which the server 120 fulfils the request.

Upon determining that the resource is not under attack, the server 120 analyzes the initial request 101 and takes one or more actions based on the request. The server 120 may process the request and may transmit a response to the requesting client device 110. In some embodiments, if the initial request is a login request (e.g., an API login request) with erroneous login credentials (username and password), the response may include a denial to access the requested resources. In some embodiments, when the server 120 is a proxy server of a cloud-based proxy service, it analyzes the request and may transmit the initial request 101 (e.g., HTTP GET at the location "example.com/login") to the appropriate origin server 130. The origin server 130 may process the request and then transmit the response (e.g., an HTTP response) with the requested resource to the proxy server. The proxy server may analyze the incoming response and take one or more actions, including, for example, transmitting the response to the requesting client device 110. In this embodiments, the proxy server may also cache resources for the domain and may retrieve the requested network resource from the cache without transmitting the request to the origin server 130. In one embodiment, the proxy server may request the resource from the origin server 130 when the requested resource is not in the local cache of the proxy server or the cached resource has expired.

Upon determining that the resource is under attack, flow moves to operation 208 at which the server 120 transmits a first response (e.g., initial response 103) to the client device 110 which causes the client device to redirect the request for the resource to a second location (which will be referred to herein as the redirect location) for a desired number of redirects. The response 103 includes a first redirection instruction to the redirect location and an indication of an initial number of redirects (i.e., the desired number of redirects) that the client device is to complete prior to the initial request for the resource being fulfilled. In some embodiments, the number of redirects is more than two. In one embodiment, the first location and the redirect location can be in the same domain, alternatively the first location and the redirect location can be in different domains. In some embodiments, the desired number of redirects is encoded within the redirect location which is part of the second request. Further the redirect location may further include the initial location of the resource as well as a cryptographic portion for authentication and verification purposes. In some embodiments, the redirect location may include an encoded expression (cryptographic token) as described in further details with reference to FIGS. 3A-B.

Flow then moves to operation 210, the server 120 receives from the client device 110, as a result of the first redirection instruction, a second request for the resource (e.g., request 201) including the redirect location. Flow then moves to operation 212 at which the server 120 determines from the second request, whether the first number of redirects has been performed. In some embodiments, the number of redirects performed by the client device since the transmission of the initial request is encoded within the redirect location which is part of the second request. For instance, in one embodiment, the server 120 may check whether the number of redirects encoded within the second location is a predetermined value, such as 0.

Upon determination that the first number of redirects has not reached the predetermined value (e.g., it is not 0), it is an indication that the client device has not yet performed the total number of redirects desired by the server 120 (for example the desired number of redirects may have been set by the server 120 when the initial request 101 was first received). Flow then moves to operation 214, at which the server 120 transmits a second response (e.g., response 203) to the client device 110 that includes a second redirection instruction to the second location. The second response 203 includes an indication of a second number of redirects that the client device 110 is to complete prior to the initial request being fulfilled. The second number of redirects is smaller than the initial number of redirects transmitted by the server 120 in the first response 103. In one embodiment, the second number of redirects is equal to the initial number of redirects decreased by one.

The second response 203 causes the client device 110 to continue to redirect the request to the second location, without fulfilling the request, for a remaining number of desired redirects. For example, the second response 203 causes the client device to transmit a third request 205 for the resource at the redirect location and the operations 210, 212 and 214 or 216 to be repeated upon receipt of the server 120 of a third request. This process is repeated for the desired number of redirects set by the server 120 until the server determines, at operation 212, that the number of redirects has been performed.

Thus, when the server 120 determines from the second request (or from a following request e.g., the third request), that the number of redirects has been performed, it is an indication that the client device has performed the total number of redirects desired by the server 120. In this case, the flow moves to operation 216, at which the server 120 fulfils the request for the resource which was identified in the initial request.

The server 120 analyzes the request and takes one or more actions based on the request. The server 120 may process the request and transmit a response to the requesting client device 110. In some embodiments, the initial location of the resource (as received in the initial request) is encoded in the redirect location. In this embodiment, the server 120 may extract the initial location from the redirect location and process the request to retrieve the resource at that initial location. In other embodiments, after determining that the number of redirects has been performed, the server 120 can send a response to the client device with a redirection instruction to the initial location, while setting a cookie or an indication that confirms the client device has performed the total number of desired redirects. The server then receives the request from the client device requesting resources at the initial location, and it checks if the "pass" cookie/indication is included in the request. Upon determining that this request includes the pass cookie/indication, the server 120 fulfils the request for the resource at the initial location. If the cookie/indication is not included the server 120 may deny the request or alternatively retransmit a redirection instruction with a new number of redirects to be performed by the client device.

In some embodiments, when the server 120 is a proxy server of a cloud-based proxy service, it analyzes the request and may transmit the request for the resource at the initial location to the appropriate origin server 130. The origin server 130 may process the request (and then transmit the response with the requested resource to the proxy server. The proxy server may analyze the incoming response and take one or more actions, including, for example, transmitting the response to the requesting client device 110. In this embodiment, the proxy server may also cache resources for the domain and may retrieve the requested network resource from the cache without transmitting the request to the origin server 130. In one embodiment, the proxy server may request the resource from the origin server 130 when the requested resource is not in the local cache of the proxy server or the cached resource has expired.

In some embodiments prior to transmitting the response, the server 120 may be operative to delay the response by a second predetermined period of time introducing further delay in the response to the initial request 101 in addition to the delay caused by the redirection process described above.

The embodiments of the flow diagrams enable delay of the processing of a request received at a server by causing a determined number of redirects prior to a request being fulfilled. This enables protection of the server (and or domains serviced by the server as part of a cloud-based proxy service) against malicious attacks. In particular the mechanisms presented herein can be used to counter brute-force login attack on API. It is common for client devices to stop requesting a resource at a maximum of 10 redirects, therefore the server may select an adequate number of redirects that will cause client devices to automatically stop requesting the resources. The embodiments presented herein introduce a delay in the processing of request from client devices by using the network delay without requiring significant computation time from the server, and without requiring any processing at the client device.

Figure 3A:
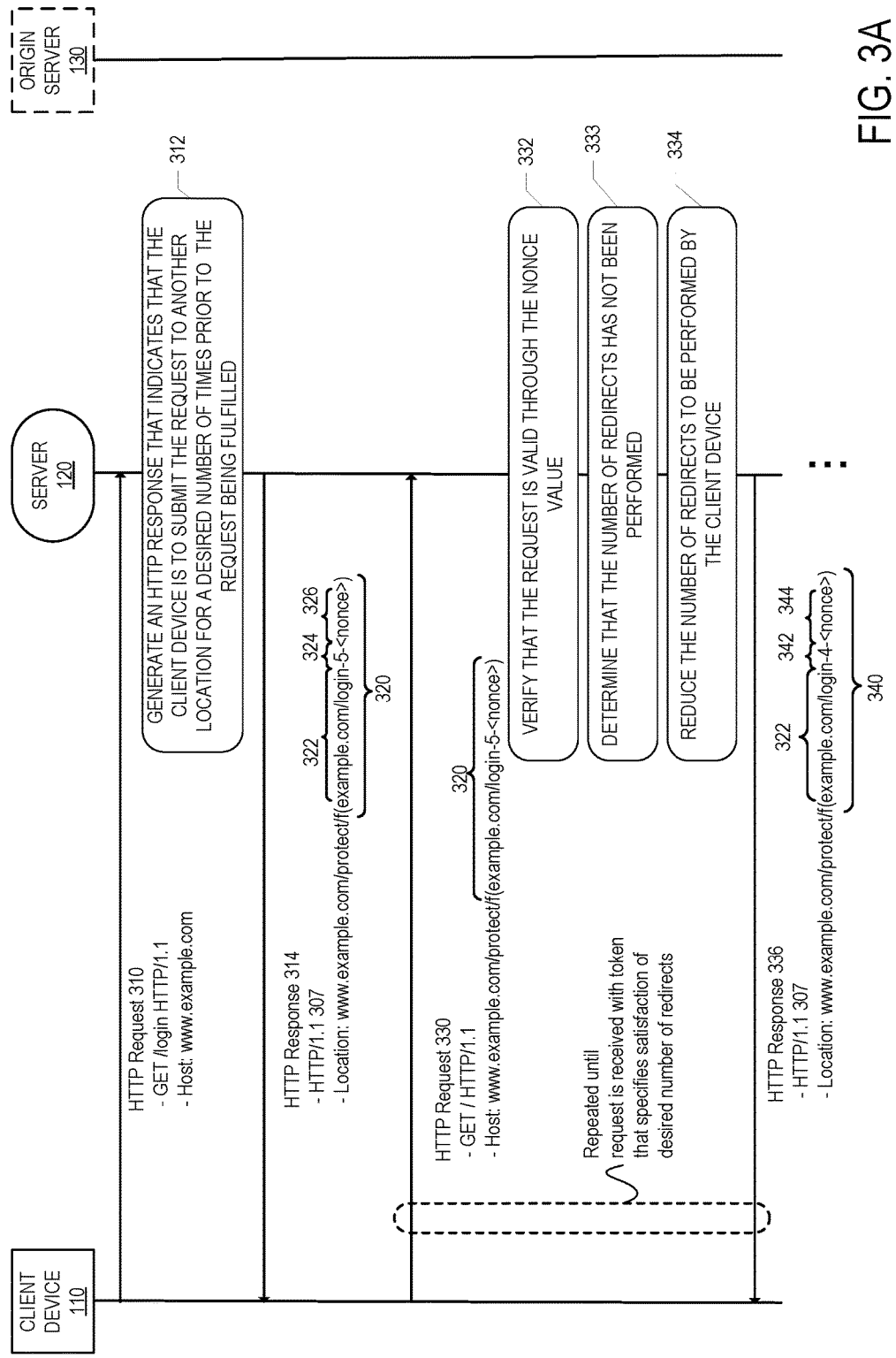
FIG. 3A illustrates exemplary detailed operations performed for delaying processing of a request for Internet resources in accordance with one embodiment.
Figure 3B:
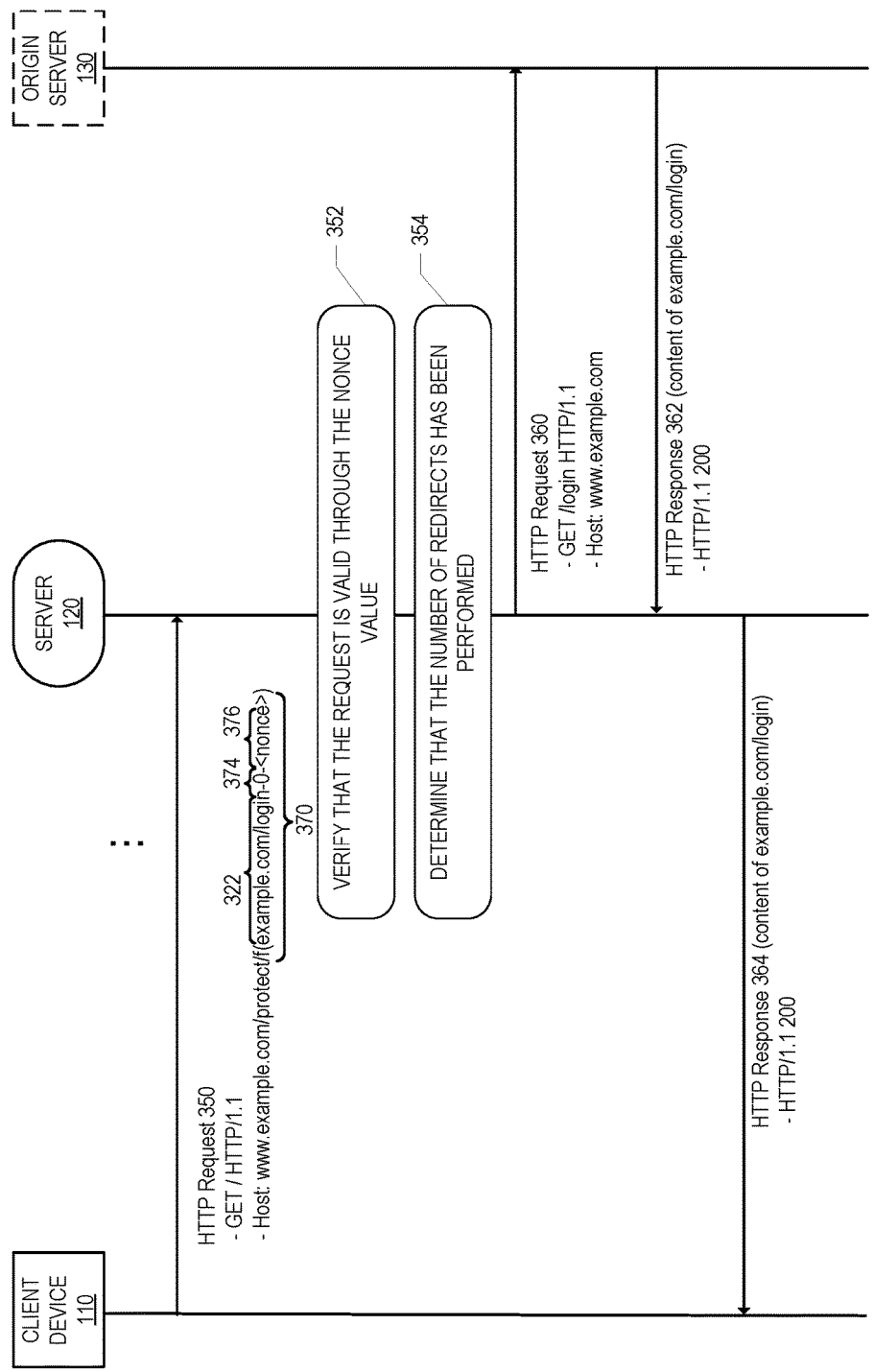
FIG. 3B illustrates a block diagram of exemplary detailed operations performed when a number of redirect has been performed by a client device in accordance with one embodiment.

FIGS. 3A and 3B illustrate exemplary detailed operations performed for delaying processing of a request for Internet resources in accordance with one embodiment. The server 120 receives an initial HTTP request 310 for a resource where the request includes a first location of the resource "/login" at the domain www.example.com. The server 120 analyzes the initial request 310 and generates at operation 312 an HTTP response that indicates that the client device is to submit the request for the resource to another location for a desired number of times prior to the request being fulfilled. The server 120 transmits the generated response 314 to the client device 110 which causes the client device to perform the desired number of redirects prior to the request for the resource being fulfilled. The response 314 includes a first cryptographic token 320. For example the first response can be an HTTP response with a "307" code to indicate the "Temporary Redirect." The response 314 includes a redirect location (e.g., URI "example.com/protect/f(example.com/login-5-<nonce>)"). In this exemplary embodiment, the redirect location includes the cryptographic token 320 "f(example.com/login-5-<nonce>)". In one embodiment, the cryptographic token is a function of the initial location 322 of the resource ("example.com/login"), the number of redirects 324 desired by the server 120 (e.g., N=5), and a cryptographic portion 326 (<nonce>). For example, the cryptographic token may be an encoding of the expression comprising the initial location, the number of redirects and the nonce with a key known to the server 120. In some embodiments, the server 120 can select the number of redirects by measuring a round trip time to the client device 110 and determining a total number of roundtrips that will delay the request by a desired amount of time. In some embodiments, the number of redirects can be selected by an administrator of a cloud-based proxy service including the server 120, or alternatively selected by the owner of the domain through a user interface of the service server 125.

The cryptographic portion "nonce" 326 is generated to prevent the replay of the cryptographic token for other requests. For example, the nonce may specify a limited validity time period for the cryptographic token and may contain a large amount of randomness. Thus the cryptographic portion ensures that old cryptographic tokens cannot be reused in replay attacks. The server 120 generates the nonce such that the token value would be difficult to predict by malicious users (e.g., a botnet operator). The nonce value may be generated in a number of different ways. For example, the nonce value may be generated using a cryptographic algorithm such as Time-based One-time Password Algorithm (TOTP), described in RFC 6238, May 2011. As another example, a seeded pseudo-random number generator with a seed that is not publicly known (e.g., known only to the server generating the pseudo-random number or to the cloud-based proxy service, when the server 120 is a proxy server of the service) may be used to generate the nonce value. As another example, an encrypted timestamp using a key that is not publicly known (e.g., a key known only to the server 120 generating the timestamp or known only to the cloud-based proxy service when the server 120 is a proxy server of the service) may be used as the nonce value. As another example, a hashed and salted timestamp where the salt value is not publicly known (e.g., the salt value is known only to the server generating the timestamp or known only to the cloud-based proxy service, when the server 120 is a proxy server of the service) may be used as the nonce value. As yet another example, a hashed and salted timestamp where the salt value is publicly known but the timestamp has a random value appended to it that is not publicly known may be used as the token value.

The entire expression (including the initial location 322, the number of redirects 324, and the nonce 326) is encrypted using a key known to the server 120 to form the cryptographic token included with the temporary response 314 transmitted to the client device 110. The cryptographic token 320 enables the server 120 to keep track of the number of redirects that remain to be performed by the client device prior to the initial request being fulfilled and that this remaining number was not tampered by a malicious client device 110.

In some embodiments, the server 120 is an origin server which is operative to process requests received from client devices and respond to the requests by retrieving the requested resources. The origin server may host the resources or may be coupled to another server hosting the resources. In these embodiments, upon receipt of the initial request 101 instead of responding to the request and transmitting the resources to the client device 110, the server transmits the temporary redirect message causing the client device to redirects the request a predetermined number of redirects prior to the request being fulfilled consequently causing a delay in a response to the request.

The server then receives a second request 330 for the resource at the second location "example.com/protect/f(example.com/login-5-<nonce>)". The second location includes the cryptographic token 320. While the embodiments, below will be described with the server 120 receiving the request for the resource at the second location (i.e., the redirect location), in alternative embodiments, the request 330 can resolve to another server (not illustrated) which is different from the server 120. This other server may be located remotely from the server 120 adding an additional delay in the fulfillment of the initial request 310. In some embodiments, this other server is an electronic device that may be administered by the same entity as the server 120. In one embodiment, this server is dedicated for processing redirected requests and will be operative to perform the operations 332, 333, 352, and 354 as described with reference to server 120.

Upon receipt of the second request 330, the server 102 analyses it and extracts the cryptographic token 320. The cryptographic token 320 enables the server 120 to determine the number of redirects remaining prior to having the initial request fulfilled, and to determine that this number was not tampered by a malicious client device 110. In one embodiment if the client device has attempted to alter the cryptographic token transmitted in a previous response by the server 120, upon analysis of this token the server can detect the defect and block the user. Thus at operation 332, the server 120 verifies that the request is valid through the nonce value included in the cryptographic token 320. For example, the server 120 may determine upon decryption of the token that the structure of the expression was changed or that the cryptographic portion (<nonce>) is invalid. When the nonce is not valid, the proxy server blocks the client device and may also log that the client device has been blocked, which may affect a threat score applied to the client device.

When the nonce is valid, the proxy server moves to performing operation 333 and determines whether the number of redirects has been performed or not. In the illustrated example, upon determination that the number of redirects within the cryptographic token of the request 330 has a value of 5, the server determines that the number of redirects has not yet been performed (for example by determining that the number of redirects is greater than 0). At operation 334, the server reduces the number of redirects to be performed by the client device and the response 336 is transmitted to the client device 110 with a second number of redirects. The second number of redirects is smaller than the initial number of redirects transmitted by the server 120 in the first response 314. In one embodiment, the second number of redirects is equal to the initial number of redirects decreased by one (N=4).

The response 336 includes the redirect location (e.g., URI "example.com/protect/f(example.com/login-4-<nonce>)"). The redirect location includes the cryptographic token 340 (f(example.com/login-4-<nonce>). In one embodiment, the cryptographic token is a function of the initial location 322 of the resource ("example.com/login"), the reduced number of redirects 342 desired by the server 120 (e.g., N=4), and a cryptographic portion 344 (<nonce>). The cryptographic token may be an encoding the expression comprising the initial location, the number of redirects and the nonce with a key known to the server 120. Similarly to the nonce 326, the nonce 344 is generated to prevent the replay of the cryptographic token 340 for other requests. For example, the nonce may specify a limited validity time period for the cryptographic token 340 and may contain a large amount of randomness. Thus the cryptographic portion (nonce 344) ensures that old cryptographic tokens cannot be reused in replay attacks.

The transmission of redirected requests (e.g., request 330) by the client device and transmission of responses including redirection instructions by the server 120 (e.g., response 336) is repeated, until a request is received at the server 120 with a cryptographic token that indicates that a desired number of redirects was performed.

FIG. 3B illustrates a block diagram of exemplary operations performed when a number of redirects has been performed by the client device in accordance with some embodiments. Following repeated redirections performed after the initial request 310, the server 120 receives the request 350 including the cryptographic token 370. The cryptographic token 370 includes an encoding of the location 322 of the initial request, the remaining number of redirects 374, and the nonce 376. Thus at operation 352, the server 120 verifies that the request is valid through the nonce value 376 included in the cryptographic token 370. When the nonce is not valid, the proxy server blocks the client device and may also log that the client device has been blocked, which may affect a threat score applied to the client device.

When the nonce is valid, the server 120 moves to performing operation 354 and determines whether the number of redirects has been performed or not. In the illustrated example, upon determination that the number of redirects within the cryptographic token of the request 370 has a value of 0, the server determines that the number of redirects has been performed and causes the request to be fulfilled.

Upon determining that the number of redirects was performed and that the request is to be fulfilled. The server 120 analyzes the request and takes one or more actions based on the request. In some embodiments, the initial location 322 of the resource (as received in the initial request) is encoded in the redirect location as part of the cryptographic token 370. In some embodiments, the initial location 322 of the resource (as received in the initial request 310) is encoded in the redirect location. In this embodiment, the server 120 may extract the initial location 322 from the redirect location and process the request to retrieve the resource at that initial location. In other embodiments, after determining that the number of redirects has been performed, the server 120 can send a response to the client device with a redirection instruction to the initial location 322, while setting a cookie or an indication that confirms the client device has performed the total number of desired redirects. The server then receives the request from the client device requesting resources at the initial location 322, and it checks if the "pass" cookie/indication is included in the request. Upon determining that this request includes the pass cookie/indication, the server 120 fulfils the request for the resource at the initial location. If the cookie/indication is not included the server 120 may deny the request or alternatively retransmit a redirection instruction with a new number of redirects to be performed by the client device.

In some embodiments, when the server 120 is a proxy server of a cloud-based proxy service, it analyzes the request and may transmit the request for the resource at the initial location 322 to the appropriate origin server 130. For example, the server 120 may transmit the request 360 for the resource at the initial location "www.example.com" to the origin server 130 which hosts this resource. The server 120 may receive a response 362 (with the content of the resource at the location example.com/login). The proxy server may analyze the incoming response and take one or more actions, including, for example, transmitting the response to the requesting client device 110. For instance, content of the response 362 may be transmitted from the server 120 to the client device 110 as part of the response 364. In this embodiments, the proxy server may also cache resources for the domain and may retrieve the requested network resource from the cache without transmitting the request to the origin server 130. In one embodiment, the server 120 may request the resource from the origin server 130 when the requested resource is not in the local cache of the proxy server or the cached resource has expired.

In some embodiments prior to transmitting the response 364, the server 120 may be operative to delay the response by a second predetermined period of time introducing further delay in the response to the initial request 101 in addition to the delay caused by the redirection process described above.

Figure 4:
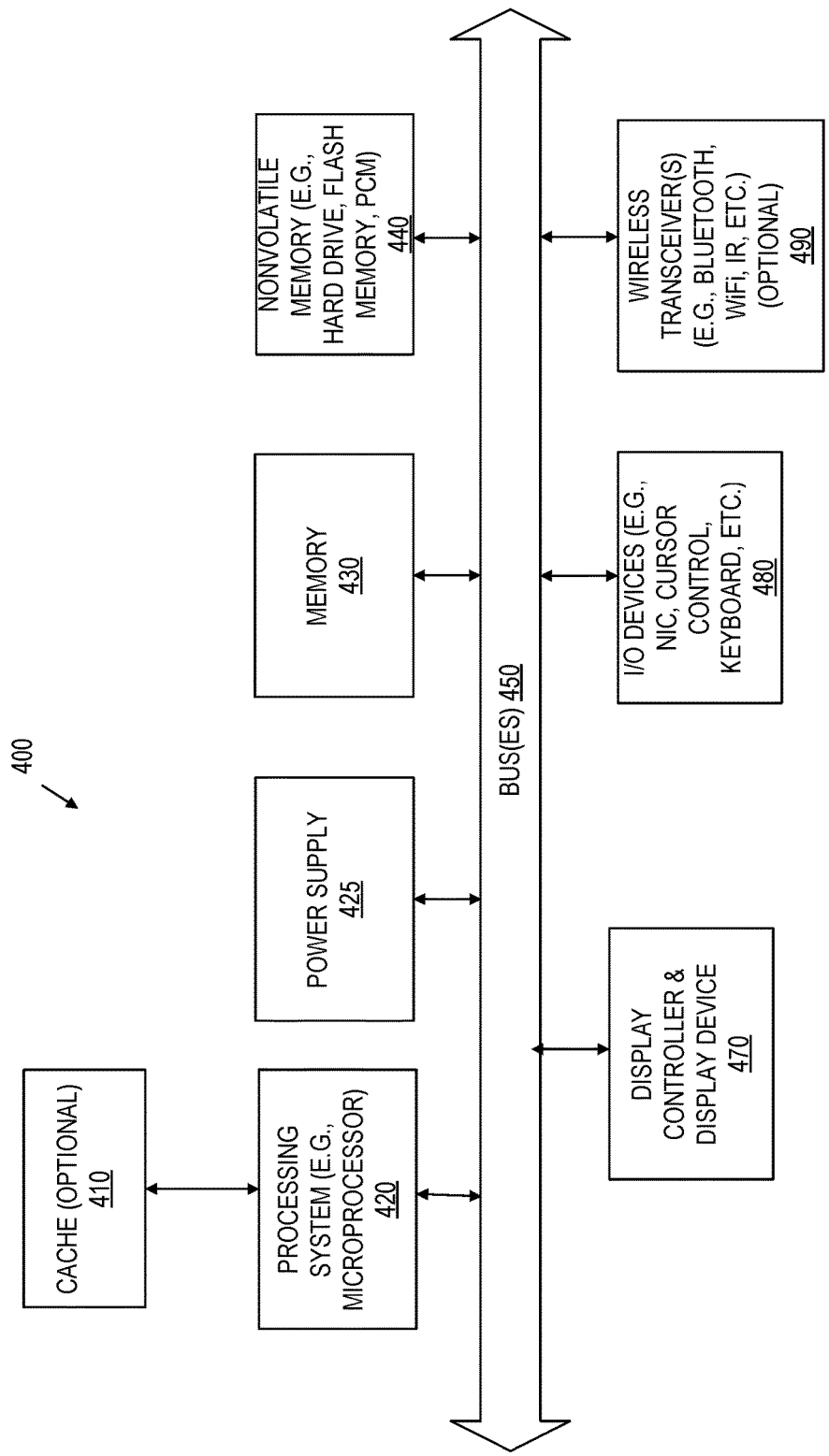
FIG. 4 is a block diagram illustrating an exemplary computer system according to some embodiments of the invention.

As illustrated in FIG. 4, the computer system 400, which is an electronic device, includes the bus(es) 450 which is coupled with the processing system 420, power supply 425, memory 430, and the nonvolatile memory 440 (e.g., a hard drive, flash memory, Phase-Change Memory (PCM), etc.). The bus(es) 450 may be connected to each other through various bridges, controllers, and/or adapters as is well known in the art. The processing system 420 may retrieve instruction(s) from the memory 430 and/or the nonvolatile memory 440, and execute the instructions to perform operations described herein. The bus 450 interconnects the above components together and also interconnects those components to the display controller & display device 470, Input/Output devices 480 (e.g., NIC (Network Interface Card), a cursor control (e.g., mouse, touchscreen, touchpad, etc.), a keyboard, etc.), and the optional wireless transceiver(s) 490 (e.g., Bluetooth, WiFi, Infrared, etc.). In one embodiment, the client device 110, the service server 125, the server 120, and/or the origin servers 130 can take the form of the computer system 400.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server comprising:
   receiving, from a client device, a first request for a resource, wherein the first request includes a first location;
   transmitting a first response to the client device that includes a first redirection instruction to a second location at a second server, wherein the first response includes an indication of a first number of redirects that the client device is to complete prior to the first request being fulfilled, and wherein the first number of redirects is two or more, wherein the second server is located remotely from the server that received the first request for the resource; and
   causing the second server to:
   receive, from the client device, a second request for the resource, where the second request includes the second location as a result of the first redirection instruction,
   responsive to determining, from the second request, that the first number of redirects has not been performed, perform the following:
   (a) transmit a second response to the client device that includes a second redirection instruction to the second location, wherein the second response includes an indication of a second number of redirects that the client device is to complete prior to the first request being fulfilled, and wherein the second number of redirects is smaller than the first number of redirects,
   (b) receive, from the client device, a third request for the resource as a result of the second redirection instruction, wherein the third request includes the second location,
   (c) responsive to determining, from the third request, that the second number of redirects has not been performed by the client device, repeat (a) and include an indication of a reduced number of redirects until receipt of a request from the client device that indicates that the reduced number of redirects has been performed by the client device, and
   (d) responsive to determining, from the third request, that the second number of redirects has been performed by the client device, fulfil the first request.

2. The method of claim 1, wherein the first response includes an encoding of the first location, the first number of redirects and a cryptographic portion indicating a validity time limit.

3. The method of claim 1, wherein the second response includes an encoding of the second number of redirects, and the method further comprises retrieving the second number of redirects from the second response by decoding a portion of the second response with a key known to the server.

4. The method of claim 1, wherein the first location and the second location are at different domains.

5. The method of claim 1, wherein the second number of redirects is equal to the first number of redirects decreased by one.

6. The method of claim 1, wherein the method is performed in a proxy server and the resource is hosted at an origin server located remotely from the proxy server, and wherein the proxy server is situated between the client device and the origin server.

7. The method of claim 6, wherein fulfilling the first request includes:
transmitting the first request to the origin server; and
in response to a processing of the first request at the origin server, receiving the requested resource from the origin server to be transmitted to the client device.

8. The method of claim 6, wherein receiving from a client device the first request is a result of a DNS request for a domain of the resource resolving to the proxy server instead of the origin server.

9. The method of claim 1, further comprising determining that the resource is under attack prior to transmitting the first response to the client device.

10. The method of claim 9, wherein the first request includes first account information for securely accessing a user account at the first location, and wherein determining that the resource is under attack includes at least in part determining that the first account information is invalid.

11. A server comprising:
a non-transitory computer readable storage medium to store instructions; and
a processor coupled with the non-transitory computer readable storage medium to process the stored instructions to:
receive, from a client device, a first request for a resource, wherein the first request includes a first location;
transmit a first response to the client device that includes a first redirection instruction to a second location at a second server, wherein the first response includes an indication of a first number of redirects that the client device is to complete prior to the first request being fulfilled, and wherein the first number of redirects is two or more, wherein the second server is located remotely from the server that received the first request for the resource; and
causing the second server to:
receive, from the client device, a second request for the resource, where the second request includes the second location as a result of the first redirection instruction; and
responsive to determining, from the second request, that the first number of redirects has not been performed, perform the following:
(a) transmit a second response to the client device that includes a second redirection instruction to the second location, wherein the second response includes an indication of a second number of redirects that the client device is to complete prior to the first request being fulfilled, and wherein the second number of redirects is smaller than the first number of redirects,
(b) receive, from the client device, a third request for the resource as a result of the second redirection instruction, wherein the third request includes the second location,
(c) responsive to determining, from the third request, that the second number of redirects has not been performed by the client device, repeat step (a) and include an indication of a reduced number of redirects until receipt of a request from the client device that indicates that the reduced number of redirects has been performed by the client device, and
(d) responsive to determining, from the third request, that the second number of redirects has been performed by the client device, fulfil the first request.

12. The server of claim 11, wherein the first response includes an encoding of the first location, the first number of redirects and a cryptographic portion indicating a validity time limit.

13. The server of claim 11, wherein the second response includes an encoding of the second number of redirects, and the processor is further to retrieve the second number of redirects from the second response by decoding a portion of the second response with a key known to the server.

14. The server of claim 11, wherein the first location and the second location are at different domains.

15. The server of claim 11, wherein the second number of redirects is equal to the first number of redirects decreased by one.

16. The server of claim 11, wherein server is a proxy server and the resource is hosted at an origin server located remotely from the proxy server, and wherein the proxy server is situated between the client device and the origin server.

17. The server of claim 16, wherein to fulfil the first request includes to:
transmit the first request to the origin server; and
in response to a processing of the first request at the origin server, receive the requested resource from the origin server to be transmitted to the client device.

18. The server of claim 16, wherein to receive from a client device the first request is a result of a DNS request for a domain resolving to the proxy server instead of the origin server.

19. The server of claim 11, wherein the processor is further to determine that the resource is under attack prior to transmit the first response to the client device.

20. The server of claim 19, wherein the first request includes first account information for securely accessing a user account at the first location, and wherein to determine that the resource is under attack includes at least in part determining that the first account information is invalid.

21. A non-transitory computer readable storage medium that provide instructions, which when executed by a processor of a server, cause said processor to perform operations comprising:
receiving, from a client device, a first request for a resource, wherein the first request includes a first location;
transmitting a first response to the client device that includes a first redirection instruction to a second location at a second server, wherein the first response includes an indication of a first number of redirects that the client device is to complete prior to the first request being fulfilled, and wherein the first number of redirects is two or more, wherein the second server is located remotely from the server that received the first request for the resource; and causing the second server to:
  receive, from the client device, a second request for the resource, where the second request includes the second location as a result of the first redirection instruction; and
  responsive to determining, from the second request, that the first number of redirects has not been performed, perform the following:
    (a) transmit a second response to the client device that includes a second redirection instruction to the second location, wherein the second response includes an indication of a second number of redirects that the client device is to complete prior to the first request being fulfilled, and wherein the second number of redirects is smaller than the first number of redirects,
    (b) receive, from the client device, a third request for the resource as a result of the second redirection instruction, wherein the third request includes the second location,
    (c) responsive to determining, from the third request, that the second number of redirects has not been performed by the client device, repeat step (a) and including an indication of a reduced number of redirects until receipt of a request from the client device that indicates that the reduced number of redirects has been performed by the client device, and
    (d) responsive to determining, from the third request, that the second number of redirects has been performed by the client device, fulfil the first request.

22. The non-transitory computer readable storage medium of claim 21, wherein the first response includes an encoding of the first location, the first number of redirects and a cryptographic portion indicating a validity time limit.

23. The non-transitory computer readable storage medium of claim 21, wherein the second response includes an encoding of the second number of redirects, and the operations further include retrieving the second number of redirects from the second response by decoding a portion of the second response with a key known to the server.

24. The non-transitory computer readable storage medium of claim 21, wherein the first location and the second location are at different domains.

25. The non-transitory computer readable storage medium of claim 21, wherein the second number of redirects is equal to the first number of redirects decreased by one.

26. The non-transitory computer readable storage medium of claim 21, wherein the operations are performed in a proxy server and the resource is hosted at an origin server located remotely from the proxy server, and wherein the proxy server is situated between the client device and the origin server.

27. The non-transitory computer readable storage medium of claim 26, wherein fulfilling the first request includes:
  transmitting the first request to the origin server; and
  in response to the processing of the first request at the origin server, receiving the requested resource from the origin server to be transmitted to the client device.

28. The non-transitory computer readable storage medium of claim 26, wherein receiving from a client device the first request is a result of a DNS request for a domain resolving to the proxy server instead of the origin server.

29. The non-transitory computer readable storage medium of claim 21, wherein the operations further include determining that the resource is under attack prior to transmitting the first response to the client device.

30. The non-transitory computer readable storage medium of claim 29, wherein the first request includes first account information for securely accessing a user account at the first location, and wherein determining that the resource is under attack includes at least in part determining that the first account information is invalid.

\* \* \* \* \*